United States Patent

Kounoike et al.

Patent Number: 5,055,214
Date of Patent: Oct. 8, 1991

[54] MAGNETIC MATERIAL FOR MICROWAVE AND MILLIMETER WAVE FREQUENCIES

[75] Inventors: Takehiro Kounoike, Asiya; Kunisaburo Tomono, Kyoto, both of Japan

[73] Assignee: Murata Mfg. Co., Ltd., Japan

[21] Appl. No.: 538,210

[22] Filed: Jun. 14, 1990

[30] Foreign Application Priority Data

Jun. 15, 1989 [JP] Japan .................................. 1-153127

[51] Int. Cl.$^5$ .......................... C04B 35/40; H01F 1/00
[52] U.S. Cl. ................................ 252/62.57; 252/62.56
[58] Field of Search ........................... 252/62.56, 62.57

[56] References Cited

U.S. PATENT DOCUMENTS

3,418,241 12/1968 Weis .................................. 252/62.57
3,419,496 12/1968 Vassiliev et al. .................. 252/62.57
3,428,144 2/1969 Gyorgy et al. ................... 252/62.57

FOREIGN PATENT DOCUMENTS

62-07631 1/1987 Japan.

*Primary Examiner*—Prince E. Willis
*Assistant Examiner*—R. D. Flatter
*Attorney, Agent, or Firm*—Ostrolenk, Faber, Gerb & Soffen

[57] ABSTRACT

A magnetic material for microwave and millimeter wave frequencies consists essentially of a composition represented by the general formula:

$$(Y_{1-x}Gd_x)_w(Fe_{1-y-z}Al_yMn_z)_{8-w}O_{12}$$

where x, y, z and w take a value within the following respective ranges: $0 \leq x \leq 0.35$, $0 \leq y \leq 0.16$, $0.01 \leq z \leq 0.04$, and $3.02 \leq w \leq 3.06$.

1 Claim, 1 Drawing Sheet

MAGNETIC MATERIAL FOR MICROWAVE AND MILLIMETER WAVE FREQUENCIES

BACKGROUND OF THE INVENTION

1. Field of the Invention

The present invention relates to a magnetic material for microwave and millimeter wave frequencies and, more particularly, to a magnetic composition for high frequency circuit elements designed for use in the microwave and millimeter wave frequency ranges.

2. Description of the Prior Art

Heretofore Mn-Mg ferrites, Ni-Zn ferrites, lithium ferrites and YIG ferrites have been used as magnetic materials for high frequencies, because as they possess a high saturation magnetization ($4\pi Ms$) ranging from 500 to 4000 gauss. In particular, the YIG ferrites are used in the production of highly stable circuit elements such as isolators and circulators.

U.S. Pat. No. 3,132,105 discloses that the saturation magnetization ($4\pi ms$) and the temperature coefficient $4\pi ms$ of a YIG ferrite may be controlled by replacing some part of the ingredients with Gd and Al. Such a modified composition makes it possible to select a magnetic material with an optimum value for the saturation magnetization moot pertinent to the operating frequencies of the circuit elements to be produced. Also, a combined use of a YIG ferrite with a permanent magnet makes it possible to compensate for the temperature characteristics of the magnet.

U.S. Pat. No. 3,419,496 discloses that the incorporation of $MnO_2$ into $Y_3Fe_5O_{12}$ makes it possible to produce a magnetic material with a volume specific resistance ($\rho$) of $4.9 \times 10^{12}$ $\Omega \cdot cm$ which is greater than that of the basic $Y_3Fe_5O_{12}$ composition, i.e., $7.0 \times 10^8$ $\Omega \cdot cm$. Japanese patent publication No. 60-55970 discloses a ferrite material of a YIG system consisting essentially of 38.63 to 39.45 mol% of $Y_2O_3$ and 61.37 to 60.55 mol% of $Fe_2O_3$. That material possesses a ferromagnetic resonance line width ($\Delta H$) of 16 Oersted (Oe) at the minimum.

However, the YIG ferrites of the prior art have a disadvantage in that a very small deviation from the composition results in considerable increases in the ferromagnetic resonance line width ($\Delta H$) and in the dielectric loss tangent (tan $\delta e$). This makes it impossible to put the prior art YIG ferrites into practical applications. Also, the greater the remanent magnetic flux density (Br) the greater is the dielectric loss tangent. As a result the ferrites cannot be applied to production of elements for phase converters which are required to have a high remanent magnetic flux density.

SUMMARY OF THE INVENTION

It is a basic object of the present invention to provide a magnetic material for microwave and millimeter wave frequencies having very small values for the ferromagnetic resonance line width ($\Delta H$) an the dielectric loss tangent (tan $\delta e$) and a high value for the remanent magnetic flux density (Br).

The above and other objects are obtained by providing a magnetic material of a $Y_wFe_{8-w}O_{12}$ system, wherein a part of Fe is replaced with Mn, and wherein a molar amount of the component in the Y site, i.e., w, is so adjusted as to have a value ranging from 3.02 to 3.06.

DETAILED DESCRIPTION OF THE INVENTION

According to the present invention, a magnetic material for microwave and millimeter wave frequencies is provided consisting essentially of a composition represented by the general formula:

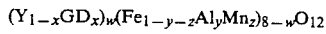

$$(Y_{1-x}GD_x)_w(Fe_{1-y-z}Al_yMn_z)_{8-w}O_{12}$$

where x, y, z and w take a value within the respective following ranges: $0 \leq x \leq 0.35$, $0 \leq y \leq 0.16$, $0.01 \leq z \leq 0.04$, and $3.02 \leq w \leq 3.06$.

The above magnetic material has a composition falling within a quadrangular area defined by points A, B, C and D in FIG. 1. The sets of molar fractions of the components at the above points are as follows:

|   | X | Y |
|---|---|---|
| A | 0.0 | 0.00 |
| B | 0.0 | 0.16 |
| C | 0.35 | 0.16 |
| D | 0.35 | 0.00 |

The reasons why the magnetic material of the present invention are limited to those having a composition defined as above are as follows.

If the molar fraction of Gd in $(Y_{1-x}GD_x)$, i.e. x, exceeds 0.35, the magnetic resonance line width ($\Delta H$) becomes too large. If the molar fraction of Al in $(Fe_{1-y-z}Al_yMn_z)$, i.e., y, exceeds 0.16, the remanent magnetic flux density (Br) and the Curie temperature (Tc) become too small. If the molar fraction of Mn in $(Fe_{1-y-z}Al_yMn_z)$, i.e., z, is less than 0.01, or if z exceeds 0.04, the magnetic resonance line width ($\Delta H$) becomes too large.

The present invention makes it possible to produce a magnetic material having a large value for the remanent magnetic flux density (Br) and a small value for the dielectric loss tangent when the molar amount of $(Y_{1-x}Gd_x)$, i.e., w, takes a value ranging from 3.02 to 3.06. However, if w is less than 3.02, the dielectric loss tangent (tan $\delta e$) becomes too large. Also, if w exceeds 3.06, the magnetic resonance line width ($\Delta H$) becomes too large and the remanent magnetic flux density (Br) becomes too small.

The magnetic material of the present invention possesses a saturation magnetization ($4\pi Ms$) ranging from 320 to 1760 gauss and makes it possible to obtain any desired values for the saturation magnetization within the above range. This makes it possible to select a magnetic material with a value for the saturation magnetization ($4\pi ms$) most pertinent to the operating frequency of the circuit elements to be produced.

Also, the magnetic material of the present invention may take any values for the temperature coefficient ($4\pi ms$ ($\alpha$)) within the range of $-900$ to $-2560$ ppm/° C. Thus, the combined use of the magnetic material of the present invention with a permanent magnet makes it possible to compensate for the temperature characteristics of the magnet. Further, the magnetic material of the present invention is high in the remanent magnetic flux density (Br), but small in the ferromagnetic resonance line width ($\Delta H$) and in the dielectric loss tangent (tan $\delta e$). This makes it possible to obtain a magnetic material fitted for production of latching type phase converters, high precision isolators, circulators, and the like.

The above and other objects, features and advantages of the present invention will be further apparent from the following explanation with reference to the examples and accompanying drawings.

EXAMPLE

The raw materials, highly purified $Y_2O_3$, $Fe_2O_3$, $Gd_2O_3$, $Al_2O_3$ and $MnO_2$, were weighed in the proportions shown in Table 1, and milled by a wet process for 16 hours with a ball mill. After drying, the resultant mixture was calcined at 1050° C. for 2 hours, crushed and then ground along with an organic binder by the wet process for 16 hours with a ball mill. After drying, the resultant powder was passed through a 50 mesh sieve to prepare granulated powder. The resultant powder was compacted at a pressure of 2000 Kg/cm² to form square rods with a size of 3 mm×3 mm×20 mm and rings with a size of 36 mm (outer diameter)×24 mm (inner diameter)×6 mm (thickness). The resultant green compacts were fired at 1460° to 1490° C. for 8 hours. The square rods were machined to prepare spherical specimens with a diameter of 1.3 mm and columnar specimens with a diameter of 1.3 mm and a length of 16 mm.

For each spherical specimen, measurements were made for the saturation magnetization (4πms), temperature coefficient of saturation magnetization (α), ferromagnetic resonance line width (ΔH) and Curie temperature (Tc).

The saturation magnetization (4πms), temperature coefficient of saturation magnetization (α) and Curie temperature (Tc) were measured with a vibrating sample magnetometer. The ferromagnetic resonance line width (ΔH) at 10 GHz was measured with a TE106 mode cavity resonator by a method defined by Japan Industrial Standard C-2561.

For each columnar specimen, measurements were made for dielectric loss tangent (tan δe) at 10 GHz with a TM101 mode cavity resonator by the perturbation method defined in Japan Industrial Standard C-2561.

For each ring specimen with bifilar toroidal coils, measurements were made for remanent magnetic flux density (Br) at 100 Hz and coercive force (Hc) at 100 Hz by drawing B-H (magnetic flux density to applied magnetic field) hysterisis curves.

Figure 1:
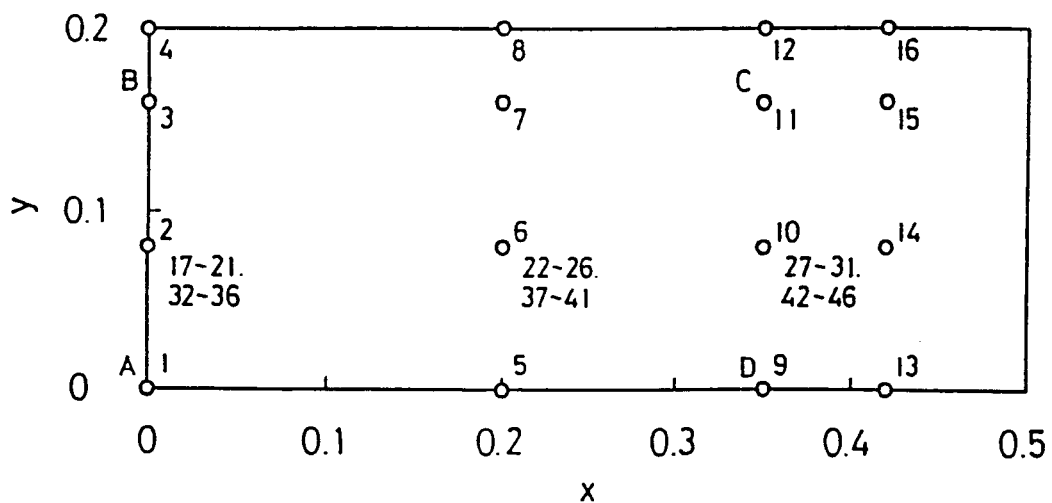
FIG. 1 is a phase diagram of a magnetic material of a $(Y_{1-x}Gd_x)_w(Fe_{1-y-z}Al_yMn_z)_{8-w}O_{12}$ system, showing the compositional area of the magnetic material according to the present invention.
Figure 2:
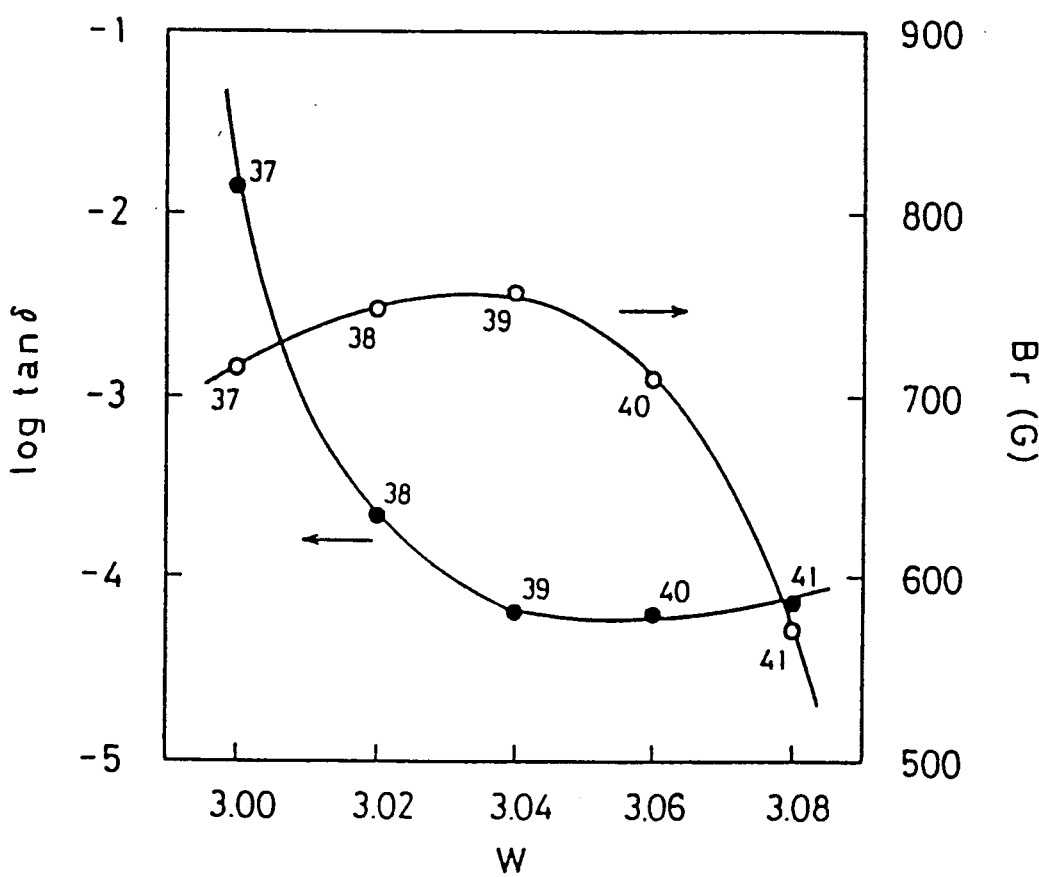
FIG. 2 is a graph showing the effects of a value of w in the system $(Y_{1-w}Gd_x)_w(Fe_{1-y-z}Al_yMn_z)_{8-w}O_{12}$ on the dielectric loss and the remanent magnetic flux density of the magnetic material.

The results are shown in Table 1 and FIG. 2. In the table, the specimens with an asterisk (*) are those out of the scope of the present invention. The other specimens are those falling within the scope of the present invention as defined in the phase diagram of FIG. 1. The compositions of the specimens are plotted in FIG. 1 with numerals corresponding to that of the specimen numbers.

TABLE 1

| No. | $(Y_{1-x}Gd_x)_w(Fe_{1-y-z}Al_yMn_z)_{8-w}O_{12}$ | | | | 4πMs gauss | α (ppm/°C.) | ΔH (Oe) | tan δe (× 10⁻⁵) | Br gauss | Hc (Oe) | Tc (°C.) |
|---|---|---|---|---|---|---|---|---|---|---|---|
| | x | y | z | w | | | | | | | |
| 1 | 0 | 0 | 0.02 | 3.04 | 1760 | −2550 | 27 | 8.8 | 1430 | 0.68 | 280 |
| 2 | 0 | 0.08 | 0.02 | 3.04 | 1220 | −2520 | 29 | 7.9 | 1005 | 0.72 | 215 |
| 3 | 0 | 0.16 | 0.02 | 3.04 | 750 | −2560 | 33 | 8.1 | 610 | 0.75 | 180 |
| 4* | 0 | 0.20 | 0.02 | 3.04 | 340 | −2670 | 40 | 12.5 | 260 | 1.01 | 90 |
| 5 | 0.20 | 0 | 0.02 | 3.04 | 1480 | −2110 | 31 | 6.6 | 1225 | 0.70 | 285 |
| 6 | 0.20 | 0.08 | 0.02 | 3.04 | 900 | −2010 | 33 | 6.3 | 755 | 0.71 | 235 |
| 7 | 0.20 | 0.16 | 0.02 | 3.04 | 460 | −2250 | 38 | 8.2 | 380 | 0.83 | 185 |
| 8* | 0.20 | 0.20 | 0.02 | 3.04 | 280 | −2410 | 44 | 10.5 | 220 | 0.86 | 105 |
| 9 | 0.35 | 0 | 0.02 | 3.04 | 1130 | −760 | 38 | 10.2 | 930 | 0.76 | 280 |
| 10 | 0.35 | 0.08 | 0.02 | 3.04 | 700 | −910 | 42 | 13.5 | 580 | 0.82 | 220 |
| 11 | 0.35 | 0.16 | 0.02 | 3.04 | 320 | −1100 | 48 | 14.2 | 245 | 0.84 | 170 |
| 12* | 0.35 | 0.20 | 0.02 | 3.04 | 180 | −1320 | 60 | 14.6 | 140 | 0.80 | 95 |
| 13* | 0.42 | 0 | 0.02 | 3.04 | 1010 | −650 | 90 | 14.2 | 840 | 1.01 | 265 |
| 14* | 0.42 | 0.08 | 0.02 | 3.04 | 580 | −670 | 102 | 15.1 | 425 | 1.12 | 210 |
| 15* | 0.42 | 0.16 | 0.02 | 3.04 | 210 | −680 | 106 | 15.6 | 90 | 1.21 | 155 |
| 16* | 0.42 | 0.20 | 0.02 | 3.04 | 120 | −890 | 112 | 16.6 | 70 | 1.18 | 85 |
| 17* | 0 | 0.08 | 0 | 3.04 | 1210 | −2480 | 60 | 8.1 | 995 | 0.74 | 220 |
| 18 | 0 | 0.08 | 0.01 | 3.04 | 1220 | −2530 | 42 | 8.6 | 1005 | 0.76 | 220 |
| 19 | 0 | 0.08 | 0.02 | 3.04 | 1220 | −2520 | 29 | 7.9 | 1005 | 0.72 | 215 |
| 20 | 0 | 0.08 | 0.04 | 3.04 | 1200 | −2380 | 35 | 10.2 | 990 | 0.81 | 210 |
| 21* | 0 | 0.08 | 0.06 | 3.04 | 1190 | −2350 | 52 | 15.5 | 980 | 0.95 | 210 |
| 22* | 0.20 | 0.08 | 0 | 3.04 | 910 | −2110 | 76 | 7.2 | 770 | 0.78 | 235 |
| 23 | 0.20 | 0.08 | 0.01 | 3.04 | 900 | −2040 | 60 | 6.5 | 760 | 0.75 | 240 |
| 24 | 0.20 | 0.08 | 0.02 | 3.04 | 900 | −2010 | 33 | 6.3 | 755 | 0.71 | 235 |
| 25 | 0.20 | 0.08 | 0.04 | 3.04 | 890 | −1990 | 42 | 10.9 | 750 | 0.77 | 230 |
| 26* | 0.20 | 0.08 | 0.06 | 3.04 | 890 | −1980 | 86 | 22.4 | 750 | 0.86 | 230 |
| 27* | 0.35 | 0.08 | 0 | 3.04 | 710 | −910 | 88 | 14.1 | 580 | 0.90 | 220 |
| 28 | 0.35 | 0.08 | 0.01 | 3.04 | 710 | −920 | 76 | 13.3 | 580 | 0.86 | 210 |
| 29 | 0.35 | 0.08 | 0.02 | 3.04 | 700 | −910 | 42 | 13.5 | 580 | 0.82 | 220 |
| 30 | 0.35 | 0.08 | 0.04 | 3.04 | 700 | −900 | 58 | 23.6 | 580 | 0.82 | 215 |
| 31* | 0.35 | 0.08 | 0.06 | 3.04 | 700 | −900 | 102 | 44.9 | 570 | 0.92 | 215 |
| 32* | 0 | 0.08 | 0.02 | 3.00 | 1250 | −2570 | 36 | 1265.5 | 960 | 0.92 | 220 |
| 33 | 0 | 0.08 | 0.02 | 3.02 | 1240 | −2550 | 31 | 22.6 | 990 | 0.76 | 220 |
| 34 | 0 | 0.08 | 0.02 | 3.04 | 1220 | −2520 | 29 | 7.9 | 1005 | 0.72 | 215 |
| 35 | 0 | 0.08 | 0.02 | 3.06 | 1210 | −2520 | 32 | 8.2 | 945 | 0.72 | 205 |
| 36* | 0 | 0.08 | 0.02 | 3.08 | 1210 | −2530 | 42 | 9.2 | 730 | 0.74 | 210 |
| 37* | 0.20 | 0.08 | 0.02 | 3.00 | 930 | −2090 | 39 | 1412.5 | 715 | 0.86 | 240 |
| 38 | 0.20 | 0.08 | 0.02 | 3.02 | 920 | −2060 | 33 | 20.9 | 745 | 0.73 | 235 |
| 39 | 0.20 | 0.08 | 0.02 | 3.04 | 900 | −2010 | 33 | 6.3 | 755 | 0.71 | 235 |
| 40 | 0.20 | 0.08 | 0.02 | 3.06 | 900 | −2030 | 36 | 6.2 | 710 | 0.73 | 240 |

TABLE 1-continued

| No. | $(Y_{1-x}Gd_x)_w(Fe_{1-y-z}Al_yMn_z)_{8-w}O_{12}$ | | | | $4\pi Ms$ gauss | $\alpha$ (ppm/°C.) | $\Delta H$ (Oe) | $\tan\delta e$ ($\times 10^{-5}$) | Br gauss | Hc (Oe) | Tc (°C.) |
| --- | --- | --- | --- | --- | --- | --- | --- | --- | --- | --- | --- |
| | x | y | z | w | | | | | | | |
| 41* | 0.20 | 0.08 | 0.02 | 3.08 | 900 | −2010 | 44 | 6.7 | 570 | 0.72 | 235 |
| 42* | 0.35 | 0.08 | 0.02 | 3.00 | 740 | −930 | 48 | 1280.6 | 520 | 0.89 | 230 |
| 43 | 0.35 | 0.08 | 0.02 | 3.02 | 710 | −910 | 44 | 19.5 | 565 | 0.83 | 230 |
| 44 | 0.35 | 0.08 | 0.02 | 3.04 | 700 | −910 | 42 | 13.5 | 580 | 0.82 | 220 |
| 45 | 0.35 | 0.08 | 0.02 | 3.06 | 700 | −900 | 45 | 13.0 | 520 | 0.79 | 220 |
| 46* | 0.35 | 0.08 | 0.02 | 3.08 | 690 | −900 | 62 | 14.9 | 410 | 0.79 | 215 |

It can be seen from the data for specimens Nos. 1 to 16 that replacing Y with Gd contributes to minimizing the temperature coefficient of ($4\pi ms$ ($\alpha$)). However, when the molar fraction of Gd exceeds 0.35, this causes an increase in the ferromagnetic resonance line width ($\Delta H$) (Nos. 13–15). It can be seen from the data for specimens Nos. 4, 8, 12 and 16 that when the molar fraction of Al exceeds 0.16, this causes an increase in the ferromagnetic resonance line width ($\Delta H$) and lowers the Curie temperature (Tc).

As can be understood from the data for specimens Nos. 17–21, or 22–26, or 27–31, the ferromagnetic resonance line width ($\Delta H$) decreases with an increase in the molar fraction of Mn. However, when the molar fraction of Mn exceeds 0.04, this causes an increase in the ferromagnetic resonance line width ($\Delta H$).

FIG. 2 shows variations of the dielectric loss and the remanent magnetic flux density (Br) as a function of a value of w in the system $(Y_{1-x}Gd_x)_w(Fe_{1-y-z}Al_yMn_z)_{8-w}O_{12}$. The data for dielectric loss is plotted by taking the common logarithm of the dielectric loss tangent (tan $\delta e$).

It can be seen from the results shown in FIG. 2 and the data for specimens Nos. 32–36, or 37–41, or 42–46 in Table 1 that the magnetic composition possesses a large remanent magnetic flux density (Br) but a small dielectric loss tangent ($\delta e$) when the component of the $(Y_{1-x}Gd_x)$ site in $(Y_{1-x}GD_x)_w(Fe_{1-y-z}-Al_y-Mn_z)_{8-w}O_{12}$ is contained in an amount ranging from 3.02 to 3.06.

According to the present invention, it is possible to obtain a magnetic material with a sufficiently small ferromagnetic resonance line width ($\Delta H$), and dielectric loss tangent (tan $\delta e$), and a large remanent magnetic flux density (Br). In addition, the magnetic composition of the present invention possesses a high Curie temperature (Tc). Accordingly, it is possible to obtain a magnetic material fitted to circuit elements for microwave and millimeter wave frequencies, such as latching type phase converters, highly stable isolators, circulators and the like.

What is claimed is:

1. A magnetic material for microwave and millimeter wave frequencies consisting essentially of a composition represented by the general formula:

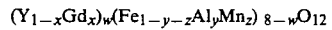

$$(Y_{1-x}Gd_x)_w(Fe_{1-y-z}Al_yMn_z)_{8-w}O_{12}$$

where x, y, z and w take a value within the following respective ranges: $0 \leq x \leq 0.35$, $0 \leq y \leq 0.16$, $0.01 \leq z \leq 0.04$, and $3.02 \leq w \leq 3.06$.

* * * * *